United States Patent [19]

Francia

[11] 4,320,663
[45] Mar. 23, 1982

[54] CONTROL SYSTEM AND METHOD FOR CONTROLLING A SOLAR ENERGY PLANT

[76] Inventor: Giovanni Francia, Via Casaregis 34, Genova, Italy

[21] Appl. No.: 132,345

[22] Filed: Mar. 20, 1980

[30] Foreign Application Priority Data

May 17, 1979 [IT] Italy ................... 68045 A/79

[51] Int. Cl.³ .............................................. F22D 5/26
[52] U.S. Cl. ................................ 60/667; 60/641.8; 126/422; 122/451.1
[58] Field of Search .............. 60/641.8, 664–667; 126/422; 122/451.1; 165/34

[56] References Cited

U.S. PATENT DOCUMENTS 2,921,441  1/1960  Buri ............................. 60/667
3,196,844  7/1965  Sulzer ......................... 122/451.1
4,054,124  10/1977 Knoos ........................ 126/422

Primary Examiner—Allen M. Ostrager
Assistant Examiner—Stephen F. Husar
Attorney, Agent, or Firm—Sughrue, Mion, Zinn, Macpeak & Seas

[57] ABSTRACT

A solar energy plant comprises a solar energy boiler having pre-heating, evaporation, and superheating stages, and a control system for maintaining constant the temperature and the volume of the superheated steam at the boiler outlet upon variations in the incident solary energy. The flow of water entering the boiler is divided into a main flow, passing through the preheating, evaporation and superheating stages, and a secondary water flow. A first part of the secondary water flow is injected directly into the evaporation stage and a second part of the secondary water flow is injected directly into the superheating stage. The control system includes valve means for varying the rate of flow of the main water flow, and the first and second parts of the secondary water flow such as to maintain constant the temperature of the output superheated steam.

26 Claims, 1 Drawing Figure

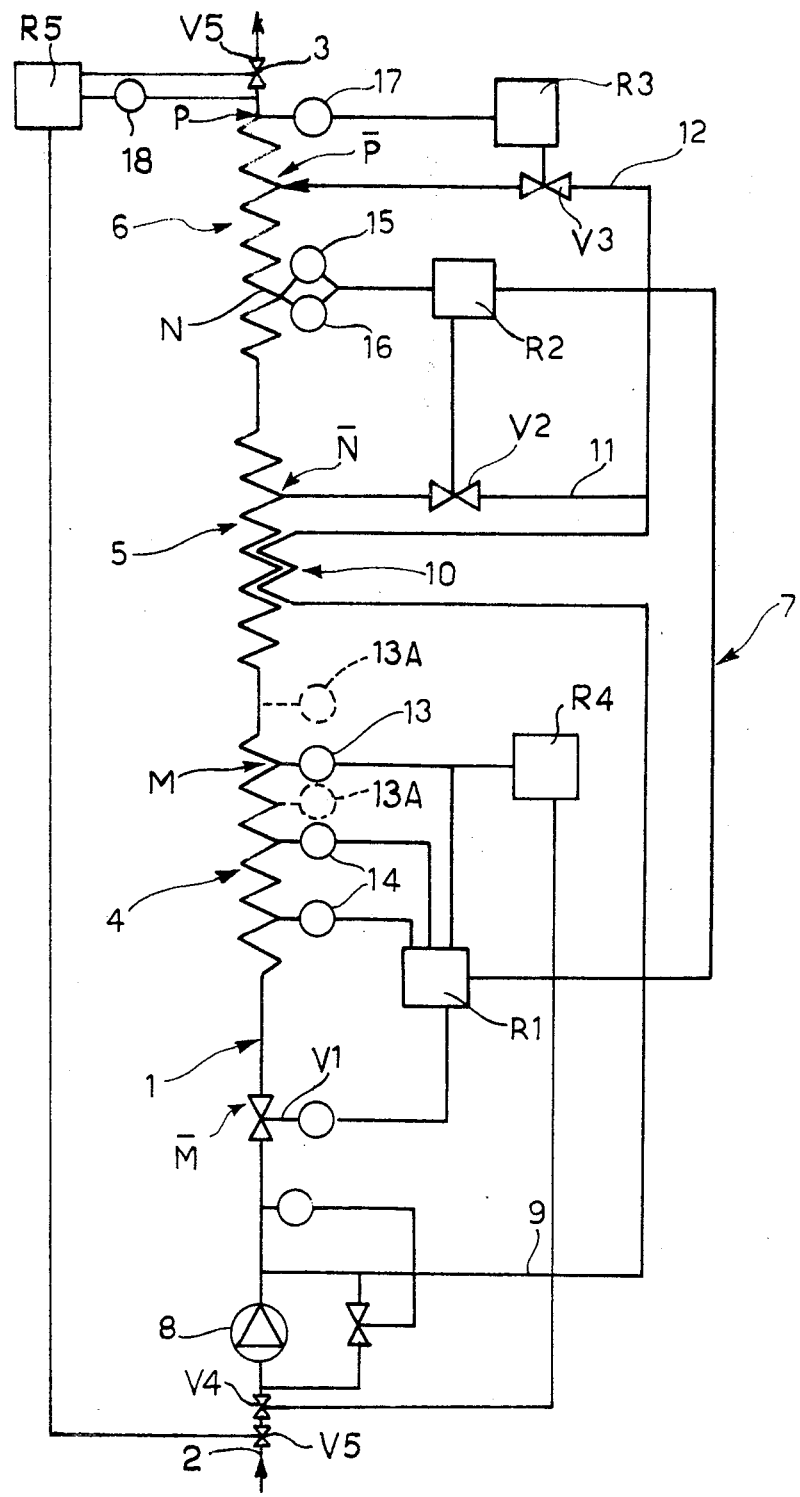

CONTROL SYSTEM AND METHOD FOR CONTROLLING A SOLAR ENERGY PLANT

The present invention relates to solar energy plants for the production of superheated steam, of the type comprising a solar energy boiler having pre-heating, evaporation, and superheating stages through which a flow of water is arranged to successively pass between an inlet and an outlet of the boiler to transform the water from a liquid state into a superheated steam state, and a control system arranged to maintain constant the temperature and volume of superheated steam at the output of the boiler in the presence of variations of the solar energy absorbed by the boiler.

The object of the present invention is to provide in the above-specified type of solar energy plant an improved control system able to operate in an automatic manner and with a degree of precision notably greater than that of the known control systems.

With a view to achieving this object, the present invention provides a solar energy plant of the above-specified type, in which the said control system comprises:

a flow-dividing arrangement for dividing water entering through the boiler inlet into a main water flow to be passed successively through said pre-heating, evaporation and super-heating stages, and a secondary water flow, ducting for feeding a first part of the secondary water flow into the evaporation stage and a second part of the secondary water flow into the superheating stage, a main control loop for varying the flow rate of the main water flow as a function of the water temperature at a first point situated towards the downstream end of the preheating stage, the main control loop in operation acting to maintain the water temperature at said first point substantially equal to a desired value, a first auxiliary control loop for varying the flow rate of the said first part of the secondary water flow as a function of the temperature T and the pressure p of the steam at a second point located in said superheating stage adjacent the upstream end thereof, said first auxiliary control loop in operation acting to maintain the value of the expression T-ap-b substantially equal to zero where a and b are two experimental constants dependent on the proportion of solar energy absorbed in the section of the boiler downstream of the said second point, and second auxiliary control means for varying the flow rate of the said second part of the secondary water flow as a function of the temperature of the superheated steam at a third point situated adjacent the outlet of the boiler, the second auxiliary control means in operation acting to maintain this superheated-steam temperature substantially constant.

Preferably, the control system is so arranged that, in steady state operating conditions of the plant, the main water flow corresponds to about 90% of the total flow of water into the boiler, whilst the said first and second parts of the secondary water flow correspond respectively to about 8% and 2% of the total inlet water flow.

According to another aspect of the invention, there is provided a method of controlling a solar energy plant of the type initially specified, said control method comprising the operations of:

dividing the flow of water entering the boiler into a main water flow, which is passed successively through said pre-heating, evaporation and superheating stages of the boiler, and a secondary flow of water, injecting a first part of the secondary water flow directly into the evaporation stage of the boiler and a second part of the secondary water flow directly into the superheating stage of the boiler.

varying the flow rate of the main water flow as a function of the temperature of the water at a first point situated towards the downstream end of the pre-heating stage such as to tend to maintain this temperature equal to a desired value, varying the flow rate of said first part of the secondary water flow as a function of the temperature T and pressure p of the steam at a second point, situated adjacent the upstream end of the superheating boiler stage, such as to tend to maintain equal to zero the value of the expression T-ap-b, where a and b are two experimental constants dependent on the proportion of solar energy absorbed in the section of the boiler downstream of the said second point, and varying the flow rate of the said second part of the secondary water flow as a function of the temperature of the superheated steam at a third point, situated adjacent the boiler outlet, such as to tend to maintain this temperature constant.

A solar energy plant embodying the invention will now be particularly described, by way of example, with reference to the accompanying drawing the sole FIGURE of which is a diagrammatic representation of the solar energy plant.

As shown in the drawing, the solar energy plant comprises a solar energy boiler represented as a duct 1 through which water to be heated can be passed. This solar energy boiler can, for example, be of the type described and illustrated in the Italian Magazine "L'ingegnere libero professionista" (No. 11/1976—pages 800-806), or of the type described and illustrated in Italian Pat. No. 1 023 927 and in the corresponding French Pat. No. 2 292 200.

The duct 1 which is schematically shown in FIG. 1 as a single pipe can in reality be a plurality of pipes disposed in parallel with one another.

The water which is to flow through the solar energy boiler enters in the liquid state into the duct 1 through an inlet 2 and leaves in the superheated steam state at the opposite end of the duct 1 through an outlet 3.

Pre-heating, evaporation and superheating of the water which flows through the boiler takes place in successive portions 4, 5 and 6 of the duct 1.

Associated with the solar energy boiler is a control system which is arranged to maintain constant the temperature and the volume of superheated steam leaving the boiler regardless of variations of the solar energy absorbed by the boiler (except, of course, where these variations are extreme). In particular, the control system is arranged to maintain the temperature $T_{SH}$ of the steam at the outlet 3 of the boiler equal to a desired predetermined theoretical value $T_{SHtr}$.

The simplest way of controlling the superheated steam outlet temperature would be to vary the rate of flow of the water fed to the boiler as a function of the temperature of the superheated steam at the outlet 3 of the boiler. In the event that the temperature of the superheated steam at the boiler outlet 3 were to fall below the desired value, it would be sufficient, according to this solution, to reduce the rate of flow of the water at the input of the boiler; similarly, in the event of the temperature of the superheated steam at the boiler outlet 3 rising above the said desired value, it would be sufficient to increase the rate of flow of the water fed to the boiler. However, such a solution does not give satisfactory results because of the relatively long time (of the order of several minutes) which the water traversing the boiler takes to pass from the inlet 2 to the outlet 3. As a consequence of this long traversal time for the water, there is an unacceptably long time lapse between the detection of a departure of the outlet steam temperature from the desired value, and the return of this temperature, following adjustment of the inlet water flow, to said desired value. In other words, the "response time" of the control system is too long, and there exists the possibility of the initiation of self excited oscillations of the steam temperature at the boiler outlet.

In contrast, the control system of the illustrated solar energy plant enables the temperature of the superheated steam at the boiler outlet to be maintained substantially equal to the said desired predetermined theoretical value $T_{SHtr}$ whilst avoiding the risk of selfexcited temperature oscillations. As will be more fully described hereinafter, the present control system includes a main control loop built around a control valve V1 and a control device R1, a first auxiliary control loop built around a control valve V2 and a control device R2, and a second auxiliary control loop built around a control valve V3 and a control device R3.

Adjacent the boiler inlet 2, the duct 1 is provided with a feed pump 8 for pumping water through the solar energy boiler.

A flow-rate control valve V1 is disposed in duct 1 downstream of the feed pump 8, and upstream of the preheating portion 4. At a point intermediate the feed pump 1 and the control valve V1, a duct 9 branches off from the duct 1 and serves to divide the flow of water to the boiler into a main water flow which successively traverses the portions 4, 5, 6 of the duct 1 and a secondary water flow which traverses the branch duct 9. The duct 9 communicates with a heat exchanger 10 and serves to feed the secondary flow of water through one flow path of the heat exchanger 10, the other flow path of the heat exchanger 10 being traversed by the main water flow during its evaporation phase. The secondary water flow leaving the heat exchanger is fed in parallel to two ducts 11, 12 respectively arranged to inject a first part of the secondary water flow directly into the duct 1 at a point N situated in the evaporation portion 5 of this duct, and to inject a second part of the secondary water flow directly into the duct 1 at a point P situated in the superheated portion of the duct. Flow control valves V2 and V3 are disposed in the ducts 11 and 12 respectively.

In steady state conditions (that is, when the actual temperature $T_{SH}$ of the superheated steam at the outlet of the boiler is continuously equal to said desired theoretical value $T_{SHtr}$), the control valve V1 is set such that about 90% of the total inlet flow of water to the boiler passes through the valve V1.

Therefore, in these conditions, the seondary flow of water corresponds to about 10% of the total inlet flow of water to the boiler. In steady state conditions, moreover, the control valves V2 and V3 respectively allow the passage through the ducts 11 and 12 of 8% and 2% respectively of the total inlet water flow.

A temperature sensor 13 is disposed at a point M situated towards the downstream end of the pre-heating portion of the duct 1. The temperature sensor 13 is connected to a main control device R1 which is arranged to control the valve V1 such that the temperature $T_M$ detected by the sensor 13 at the point M is maintained constantly equal to a predetermined value $\overline{T}_M$. The main control device R1 is an electronic device controlling the valve V1 with a modulating action of integral-proportional form on the basis of signals received from the said temperature sensor 13.

The location of point M is determined such that the portion of the boiler upstream from the said point M absorbs 21% of the overall energy absorbed by the boiler. In practice, the determination of the location of the point M must be made theoretically, inasmuch as the temperature sensor 13 must be fitted during the construction of the boiler. As a result, the actual percentage of energy absorbed by the portion of the boiler upstream of the point M will generally differ somewhat from 21% since a rigorous theoretical analysis of the operation of the plant is very difficult. It is thus generally necessary to provide for the possibility of compensating for the errors inherent in the theoretical calculations. To this end instead of a single sensor 13, there are provided a plurality of sensors 13A (shown dashed) similar to the sensor 13 and distributed along a section of the duct 1 equal in length to 60% of the distance between the inlet 2 of the boiler and the point M as determined by the theoretical calculations; the theoretically determined point M is at the median point of this section of the duct 1. In this way, once the boiler is constructed, the main control device R1 can be connected with the temperature sensor 13 which, experimentally, best satisfies the above-mentioned requirement that the portion of the boiler upstream of the sensor absorbs 21% of the overall energy absorbed.

As long as the temperature $T_M$ remains equal to the desired value $\overline{T}_M$, the main control device R1 maintains the control valve V1 set in an operating position corresponding to the passage therethrough of 90% of the total inlet flow of water to the boiler. Upon the temperature $T_M$ rising above the value $\overline{T}_M$, the main control device R1 acts on the valve V1 in such a way as to increase the flow rate of the main water flow, with a maximum flow rate value being reached when the temperature of the water at the point M exceeds the value $\overline{T}_M$ by a prefixed amount, for example 10° C. Similarly, when the temperature $T_M$ falls below $\overline{T}_M$, the main control device R1 acts on the control valve V1 in such a way as to reduce the flow rate of the main water flow with a minimum flow rate being reached when the temperature of the water at the point M falls below the value $\overline{T}_M$ by a prefixed amount, for example 10° C.; the value of this minimum flow rate is determined by safety considerations and equals, for example, 5% of the total inlet water flow to the boiler. Experiments conducted by the Applicant have shown that even with this single control effected by the value V1, the temperature $T_{SH}$ of the superheated steam at the outlet of the solar boiler is maintained constant within ±2–3% for variations in solar energy of the order of ±15%.

The solar energy boiler is associated in a known way with an optical solar energy concentration arrangement constituted by a system of mirrors of known type which reflect the solar energy on to the boiler. During the diurnal and annual variations of the caustic curve of the solar energy reflected from the mirrors, this caustic curve may become strongly asymmetrical with respect to the axis of the boiler. As a result, points of the boiler disposed upstream of the said point M may be subjected to solar energy of a greater intensity than that received at the point M. Should the boiler be subject to substantial heating with such an asymmetrical distribution of solar energy when the main water flow has a low velocity, or is totally absent, (as may occur during starting of the boiler or during a rapid build up of incident solar energy after a long interruption), then the water temperature at points upstream of the point M may exceed the temperature value $\overline{T}_M$ before the temperature of the water at the point M reaches this value.

To avoid this, the duct 1 is provided with two further temperature sensors 14 arranged upstream of the point M. The temperature sensors 14 are connected, like the temperature sensor 13, to the main control device R1. Upon starting up of the boiler or on rapid return of the sun, the control device R1 is arranged to respond initially to the temperature sensor which first detects the achievement of the said temperature value $\overline{T}_M$. However, when normal operating conditions are re-established with the temperature of the water increasing progressively from the boiler inlet 2 to the point M, the main control device R1 is arranged to control the valve V1 solely on the basis of the signals received from the temperature sensor 13.

Because water is incompressible, the response time of the main control loop built around the main control device R1 is practically nil. In other words the time lag between the instant when the temperature sensor 13 signals a departure of the temperature $T_M$ from the desired value $\overline{T}_M$ and the instant when the temperature sensor 13 signals the return of the temperature $T_M$ to the said desired value, is practically equal to zero. This minimal response time rules out the possibility of self-excited oscillations of the water temperature which could occur if there were a substantial delay in effecting the necessary correction.

The said first auxiliary control loop includes a pressure sensor 15 and a temperature sensor 16 disposed at a point N situated in the superheating portion of the duct 1. The pressure and temperature sensors 15, 16 are connected to a first auxiliary control device R2 arranged to control the valve V2 for the purpose of adjusting the flow rate of the first part of the secondary water flow (that is, the secondary flow part which is injected into the duct 1 at the point $\overline{N}$). The control effected by the device R2 on the valve V2 is such as to maintain equal to zero the value of expression T-ap-b where T and p are the values of temperature and pressure detected by the sensors 15, 16, and a and b are two experimentally determined constants whose values are dependent on the percentage of the solar energy effectively absorbed in the section of the boiler downstream of the point N.

The position of the point N along the duct 1 is chosen such that the amount of solar energy absorbed in the section of the boiler downstream of the point N is equal to 10% of the total solar energy absorbed by the boiler. Since the sensors 15, 16 must be inserted during construction of the boiler, the position of the point N must be calculated theoretically. Due to the difficulty of effecting a rigorous analysis of the plant operation, this theoretically determined position for the point N will generally be displaced from the position which in reality would satisfy the above-stated requirement of regarding the amount of solar energy absorbed downstream of the point N. Therefore, once the point N has been theoretically fixed and the sensors 15, 16 positioned accordingly, it is necessary to measure experimentally the percentage of solar energy which is effectively absorbed in the section of the boiler downstream of the point N. For each value of this percentage, there is a corresponding linear relationship between the temperature and the pressure of the steam at the point N. In other words, once the value of the percentage of the solar energy effectively absorbed in the section of the boiler downstream of the point N has been calculated, it is possible to calculate the values of the coefficients a and b.

However, the magnitude of the error resulting from the theoretical calculation of the position of the point N should not be greater than ±30%, that is, the percentage of the overall solar energy absorbed by the section of the boiler downstream of the point N should lie between 7% and 13% of the overall solar energy absorbed. Above this percentage range, the graph of the relationship between temperature and pressure at the point N no longer aproximates to a straight line; below this percentage range the response time becomes too long.

When the value of the expression T-ap-b becomes positive, the auxiliary control device R2 controls the valve V2 such as to cause an increase in the flow rate of the first part of the secondary water flow (that is, secondary flow part which is injected into the duct 1 at the point N). Conversely, when the value of the expression T-ap-b is negative, the control device R2 acts on the valve V2 such as to reduce the rate of flow of the first part of the secondary water flow. With the plant operating in steady state conditions, the flow rate of the first part of the secondary flow is in the region of 8% of the total inlet water flow to the boiler; the valve V2 under the control of the device R2 can vary this rate of flow between 0 and 40% of the total inlet flow of water to the boiler.

The control effected by the first auxiliary control loop (device R2 and valve V2) can be considered almost instantaneous in action (even for sudden changes of solar energy input from a maximum value to zero and vice versa,) both because of the speed of the secondary water flow and because of the slowness of the variations of temperature and pressure downstream from the point M. The auxiliary control effected by the device R2 and valve V2 permits a further improvement in the precision of the overall control system. In this respect, it should be noted that although the main control loop (device R1 and valve V1) already acts to maintain the temperature $T_{SH}$ of the superheated steam at the boiler outlet 3 constant with a certain precision, the control effected by the device R1 will be adversely affected by variations in the ratio between the quantity of energy absorbed respectively upstream and downstream of the point M (these variations occurring due to the slow diurnal variation of the geometry of the caustic curve of the solar energy reflected by the system of mirrors associated with the boiler).

If the ratio between the quantity of energy absorbed by the boiler respectively in the section between the point M and point N and in the section downstream from the point N was constant, the auxiliary control obtained with the first auxiliary control loop (device R2, valve V2) would enable the temperature of the steam at the boiler outlet 3 to be maintained rigorously constant. However, since this ratio does in fact vary as a consequence of the variations in the geometry of the caustic curve, the overall plant control system is provided with a second auxiliary control loop for eliminating any possible residual errors. This second auxiliary control loop comprises a second auxiliary control device R3 connected to a temperature sensor 17 located at a point P at the outlet of the boiler. The device R3 is arranged to control the valve V3 such as to vary the rate of flow of the second part of the secondary water flow (that is, the secondary flow part injected into the duct 1 at the point P).

The auxiliary control device R3 so controls the valve V3 that when the temperature $T_{SH}$ of the superheated steam at the boiler outlet 3 exceeds said desired value $T_{SHtr}$, the rate of flow of water in the duct 12 is increased. When, on the other hand, the temperature $T_{SH}$ of the superheated steam at the boiler outlet 3 falls below the said predetermined value, the control device R3 acts on the valve V3 such as to reduce the rate of flow of water in the duct 12. With the plant operating in the steady state conditions, the rate of flow in the duct 12 is equal to about 2% of the total rate of flow of water entering the boiler; however this flow rate can be varied by operation of the valve V3 under the control of the device R3, between 0% and 10% of the rate of flow of water entering the boiler.

Like the main control device R1, the auxiliary control device R2 is an electronic device arranged to control the valve V2 with a modulating action of proportional-integral form, this control being effected in dependence on signals received from the temperature and pressure sensors 15, 16.

The major effect of the diurnal and annual variations in the geometry of the caustic curve of the solar energy reflected onto the boiler by the mirror system, is to cause a variation in the ratio between the quantity of energy absorbed respectively in the section of the boiler upstream of the point M and in the section lying between the point M and the point N. To take account of this variation, the plant control system is arranged to adjust the said predetermined value $\overline{T}_M$ of the desired water temperature at the point M. To this end, the main control device R1 is connected to the auxiliary control device R2 by means of a connection 7 and is arranged to cause a slow increase in said temperature value $\overline{T}_M$ when the value of the said expression T-ap-b is negative and a slow reduction of this value $\overline{T}_M$ when the said expression has a positive value.

The plant control system further includes means, control device R4, valve V4 for substantially reducing the rate of flow of the water entering the boiler when the temperature detected by the sensor 13 is lower than the said temperature value $T_M$ by a predetermined amount, for example, 10° C. The rate of flow of water entering the boiler can be reduced, for example, to a value equal to 5% of the maximum possible flow.

In addition, the control system is provided with means control device R5, valve V5 for completely closing the inlet and outlet of the boiler when the pressure of the steam at the boiler outlet falls below a minimum admissable value, this pressure being sensed by a pressure sensor 18.

In the event of the available solar energy falling to zero and remaining there for some time, the temperature of the water detected by the sensor 13 falls below the said value $\overline{T}_M$ resulting in the flow rate of the main flow of water which passes through the valve V1 being reduced to a minimum value, for example equal to 5% of the total flow. The expression T-ap-b takes on a negative value sufficient to cause the complete interruption of the first part of the secondary water flow previously injected at the point $\overline{N}$. At this stage the water left in the boiler continues to provide superheated steam at the outlet 3, and the tendency for the temperature of this steam to fall is counteracted by a progressive reduction in the flow rate of the second part of the secondary water flow (this being the secondary flow part injected into the duct 1 at the point $\overline{P}$). When the secondary flow injection at $\overline{P}$ becomes equal to zero, the temperature $T_{SH}$ of the superheated steam at the outlet of the boiler begins to fall. This temperature fall is slow inasmuch as the heat accumulated in the boiler is being used. At the same time as the fall off in steam temperature, the pressure of the steam also reduces until it reaches the minimum value admissable for the superheated-steam utilising machine connected to the boiler (for example, a turbine). At this point the feed to the boiler is closed off completely. When the pressure in the boiler falls below a predetermined value, the boiler outlet is also closed.

If, after several hours absence, the solar energy available returns suddenly to its maximum value, the temperature in the initial portion of the boiler increased rapidly until it reaches the value $\overline{T}_M$ at one of the sensors 13, 14. At this point the main control device R1 comes into operation in the manner described above.

I claim:

1. In a solar energy plant for the production of superheated steam of the type comprising a solar energy boiler having pre-heating, evaporation, and superheating stages through which a flow of water is arranged to successively pass between an inlet and an outlet of the boiler to transform the water from a liquid state into a superheated steam state, and a control system arranged to maintain constant the temperature and volume of superheated steam at the outlet of the boiler in the presence of variations of the solar energy absorbed by the boiler, the improvement wherein the said control system comprises:

means for dividing water entering through said boiler inlet into a main water flow to be passed successively through said pre-heating, evaporation, and super-heating stages, and a secondary water flow, means for injecting a first part of the said secondary water flow into said evaporation stage and a second part of the secondary water flow into said superheating stage, a main control loop for varying the flow rate of the main water flow as a function of the water temperature at a first point situated towards the downstream end of said preheating stage, the main control loop in operation acting to maintain the water temperature at said first point substantially equal to a desired value, a first auxiliary control loop for varying the flow rate of the said first part of the secondary water flow as a function of the temperature T and the pressure p of the steam at a second point located in said superheating stage adjacent the upstream end thereof, said first auxiliary control loop in operation acting to maintain the value of the expression t-ap-b substantially equal to zero where a and b are two experimental constants dependent on the proportion of solar energy absorbed in the section of the boiler downstream of the said second point, and second auxiliary control means for varying the flow rate of the said second part of the secondary water flow as a function of the temperature of the superheated steam at a third point situated adjacent the said outlet of the boiler, the second auxiliary control means in operation acting to maintain this superheated-steam temperature substantially constant.

2. In a solar energy plant, the improved control system of claim 1, wherein said main and auxiliary control loops are so arranged that, in steady state operating conditions of the plant, the said main flow corresponds to about 90% of the total water flow into the said boiler inlet, whilst the said first part and the second part of the secondary water flow correspond to about 8% and 2% respectively of the total water flow.

3. In a solar energy plant, the improved control system of claim 1 wherein the location of said first point is selected such that the section of the boiler upstream of said first point absorbs approximately 21% of the overall solar energy absorbed by the boiler.

4. In a solar energy plant, the improved control system of claim 3 wherein the said main control loop comprises:
 at least one temperature sensor disposed at said first point,
 a flow control valve arranged upstream of said preheating stage, and
 a main control device connected to said temperature sensor and arranged to act on the control valve such as to tend to maintain the temperature detected by said sensor equal to said desired value.

5. In a solar energy plant, the improved control system of claim 4, wherein said main control device is an electronic device arranged to control the associated said valve with a modulating action of proportional-integral form in dependence on the temperature sensed by the said temperature sensor.

6. In a solar energy plant, the improved control system of claim 4, wherein a plurality of temperature sensors are provided in the boiler in the region of the location of said first point as determined theoretically, said main control device being connected to the said temperature sensor which experimentally best satisfies the condition that the section of the boiler upstream of the sensor absorbs 21% of the overall solar energy absorbed by the boiler.

7. In a solar energy plant, the improved control system of claim 6 wherein the region of the boiler in which the said plurality of temperature sensors is disposed has a length equal to 60% of the distance travelled by the main water flow between the said boiler inlet and the theoretically determined location of the said first point, the said theoretically-determined location of the first point being disposed at the centre of the said region of the boiler.

8. In a solar energy plant, the improved conrol system of claim 4 wherein in the said section of the boiler upstream of the said first point there are disposed additional auxiliary temperature sensors connected to the said main control device, the main control device being initially responsive to the sensor which first detects the achievement of the said desired temperature value upon starting up of the boiler or upon sudden return of the sun.

9. In a solar energy plant, the improved control system of claim 4 wherein there are further provided flow reduction means responsive to the output of the said sensor located at said first point to substantially reduce the flow of water entering the boiler upon the said temperature detected at the said first point falling below the said desired temperature value by a predetermined amount.

10. In a solar energy plant, the improved control system of claim 9 wherein the said flow reduction means is arranged to reduce the boiler inlet flow to 5% of the maximum possible flow when the said temperature at the said first point falls below the desired value by said predetermined amount.

11. A solar energy plant according to claim 9, characterized in that the said predetermined amount is equal to 10° C.

12. In a solar energy plant, the improved control system of claim 9, wherein shut-off means are provided for completely closing the inlet and the outlet of the boiler when the pressure of the steam at the outlet of the boiler falls below a minimum admissable value.

13. In a solar energy plant, the improved control system of claim 1, wherein the location of said second point is chosen such that the section of the boiler downstream from the said second point absorbs approximately 10% of the overall solar energy absorbed by the boiler.

14. In a solar energy plant, the improved control system of claim 13 wherein the first auxiliary control loop comprises:
 a temperature sensor and a pressure sensor disposed at the said second point,
 a flow control valve arranged to control the flow of said first part of the secondary water flow, and
 a first auxiliary control device connected to the said temperature and pressure sensors, and arranged to act on the said valve controlling the flow of the said first part of the secondary water flow such as to tend to maintain the value of the said expression T-ap-b equal to zero.

15. In a solar energy plant, the improved control system of claim 14, wherein the said first auxiliary control device is an electronic device arranged to operate on its associated said control valve with a modulating action of proportional-integral form on the basis of the outputs of the said temperature and pressure sensors.

16. In a solar energy plant, the improved control system of claim 14 when dependent on claim 4, wherein the said main and first auxiliary control devices are interconnected and arranged such as to compensate for diurnal and annual variations in the geometry of the caustic curve associated with the boiler by causing the value of said desired temperature to slowly increase when the expression T-ap-b assumes a negative value and to slowly decrease when said expression assumes a positive value.

17. In a solar energy plant, the improved control system of claim 1 wherein the said second auxiliary control loop comprises:
 a temperature sensor disposed at the said third point,
 a control valve for controlling the rate of flow of the said second part of the secondary water flow, and
 a second auxiliary control device connected to said temperature sensor disposed at said third point and arranged to act on the said valve controlling the second part of the secondary flow such as to tend to maintain constant the temperature detected by the said sensor disposed at said third point.

18. A method of controlling a solar energy plant of the type comprising a solar energy boiler having preheating, evaporation, and superheating stages through which a flow of water is arranged to successively pass between an inlet and an outlet of the boiler to transform the water from a liquid state into a superheated steam state, the control method comprising the following operations:

dividing the flow of water entering the boiler into a main water flow which is passed successively through said pre-heating, evaporation and super-heating stages of the boiler, and a secondary flow of water, injecting a first part of said secondary water flow directly into said evaporation stage of the boiler and a second part of said secondary water flow directly into said superheating stage of the boiler, varying the flow rate of the said main water flow as a function of the temperature of the water at a first point situated adjacent the downstream end of said preheating boiler stage such as to tend to maintain this temperature equal to a desired value, varying the flow rate of said first part of the secondary water flow as a function of the temperature T and pressure p of the steam at a second point, situated adjacent the upstream end of said superheating boiler stage, such as to tend to maintain equal to zero the value of the expression T-ap-b, where a and b are two experimental constants dependent on the proportion of solar energy absorbed in the section of the boiler downstream of the said second point, and varying the flow rate of the said second part of the secondary water flow as a function of the temperature of the superheated steam at a third point, situated adjacent said boiler outlet, such as to tend to maintain this temperature constant.

19. A control method according to claim 18, wherein in steady state operating conditions of the plant, said main water flow corresponds to about 90% of the total flow of water into the boiler, whilst the said first and second parts of the secondary water flow correspond to about 8% and 2% respectively of the total water flow.

20. A control method according to claim 18, wherein the location of said first point is selected such that the section of the boiler upstream of the said first point absorbs approximately 21% of the overall solar energy absorbed by the boiler.

21. A control method according to claim 18, wherein the location of said second point is selected such that the section of the boiler downstream of the said second point absorbs approximately 10% of the overall solar energy absorbed by the boiler.

22. A control method according to claim 18, wherein the said desired value of temperature at said first point is increased when the said expression T-ap-b takes on a negative value and is reduced when the said expression takes on a positive value, in such a way as to compensate for diurnal and annual variations of the geometry of the caustic curve associated with the boiler.

23. A control method according to claim 18, wherein the flow of the water entering the boiler is reduced substantially upon the temperature at the said first point falling below said desired temperature value by a predetermined amount.

24. A control method according to claim 23, wherein said predetermined amount is equal to 10° C.

25. A control method according to claim 23, wherein the flow of water entering the boiler is reduced to 5% of the maximum possible flow into the boiler upon the temperature at said first point falling below the said desired temperature value by said predetermined amount.

26. A control method according to claim 23, wherein the inlet and outlet of the boiler are completely closed when the pressure of the steam at the boiler outlet falls below a minimum admissable value.

* * * * *